United States Patent [19]

Stoehr et al.

[11] 4,321,027
[45] Mar. 23, 1982

[54] UNDER THE PRESS GRANULATOR CONSTRUCTION

[75] Inventors: Steven M. Stoehr, Hingham; Fred W. Hannula, Medfield; Thomas J. Dumaine, North Attleboro, all of Mass.; Robert D. Batting, Barrington, R.I.; Earl D. Smithern, Buffalo Grove, Ill.

[73] Assignee: Leesona Corporation, Warwick, R.I.

[21] Appl. No.: 49,573

[22] Filed: Jun. 18, 1979

[51] Int. Cl.³ ............................................. B29C 29/00
[52] U.S. Cl. ................................. 425/216; 241/101.7; 241/285 R; 264/37; 425/217
[58] Field of Search ................... 425/216, 217; 264/37, 264/161; 241/101.7 X, 285 R, 285 A, 285 B

[56] References Cited

U.S. PATENT DOCUMENTS

| | | | |
|---|---|---|---|
| 2,995,775 | 8/1961 | Schnitzius | 425/217 |
| 3,407,444 | 10/1968 | Rees | 264/37 |
| 3,418,694 | 12/1968 | Strauss | 264/37 X |
| 3,672,803 | 6/1972 | Rees | 425/217 X |
| 4,009,838 | 3/1977 | Tashman | 241/101.7 X |
| 4,071,198 | 1/1978 | Tetreault | 241/73 |

Primary Examiner—Thomas P. Pavelko
Attorney, Agent, or Firm—Robert J. Doherty

[57] ABSTRACT

A granulator primarily intended for in situ use in combination with an injection molding machine such that plastic scrap such as sprues and runners generated in such formation of plastic parts may be granulated thereby. The granulator is adapted for disposition within the confines of the injection molding machine and particularly within the drop out area thereof. A pair of rails guide the granulator in such drop out area and enable it to be laterally withdrawn to one side of the molding machine for repair, parts changes, cleaning and the like. The specific construction of the granulator includes a pair of meshed paddle rolls serving as a combination metering and feed device and removal means to remove granulated material to that end of the granulator disposed proximal said one side of the machine so as to enable efficient and quiet in situ granulation of plastic scrap generated from the injection molding procedure in a manner heitherto unattainable.

7 Claims, 5 Drawing Figures

UNDER THE PRESS GRANULATOR CONSTRUCTION

BACKGROUND AND SUMMARY OF THE INVENTION

This invention relates to granulation and particularly to the in situ granulation of plastic scrap incident in the formation of injection molded plastic parts. Such scrap material, including sprues and runners, is advantageously granulated in the vicinity of the injection molding machine (press) such as by the disposition of granulators in the aisles between adjacent injected molding machines so as to reduce manual handling of the material including such procedures as the temporary storage of the scrap next to the machines and thereafter its transportation to a central granulation point. Particularly in conjunction with three-part injection molds wherein the sprues and runners automatically drop at a location remote from that which the parts are discharged, it is known to utilize granulation machines in conjunction with one or more injection molding machines as by their disposition in adjacent aisles between such machines. In such cases, a conveying mechanism is disposed into the drop out area below the mold portions which eject the sprues and runners such as an auger conveyor so the sprues and runners are compacted while being transported to the granulator. Such a device is shown and described in U.S. Pat. No. 4,071,198 issued Jan. 31, 1978 and although useful for its intended purpose does not facilitate the several objectives of the present invention which include the safe and trouble free granulation of plastic scrap in such a manner that the conveyance or the other handling scrap prior to granulation is minimized and the floor space necessitated by such granulation kept to an absolute minimum.

These and other objects of the present invention including low sound operation are accomplished by a granulator adapted for disposition essentially entirely within the confines of the injection molding machine in the drop out area thereof. As such, plastic scrap, i.e. sprues and runners fall directly as by gravity into a pair of paddle rolls which act as a combination feed and metering means for the granulator whereby scrap is fed to the granulation chamber. Thereafter, the granulated scrap moves into a secondary chamber beneath the granulation chamber and in which an auger serves to continually move the granulate to that end of the granulator disposed generally at the entrance side of the injection molding machine drop out area. The granulator is adapted to move in and out of the drop out area, i.e. laterally of the longitudinal orientation of the injection molding machine, such that minimal, if any, added floor space is required by the granulator while disposed in its operative position with respect to the injection molding machine.

Other objects, features and advantages of the invention shall become apparent as the description thereof proceeds when considered in connection with the accompanying illustrative drawings.

DESCRIPTION OF THE DRAWINGS

In the drawings which illustrates the best modes presently contemplated for carrying out the present invention.

DESCRIPTION OF THE INVENTION

Figure 1:
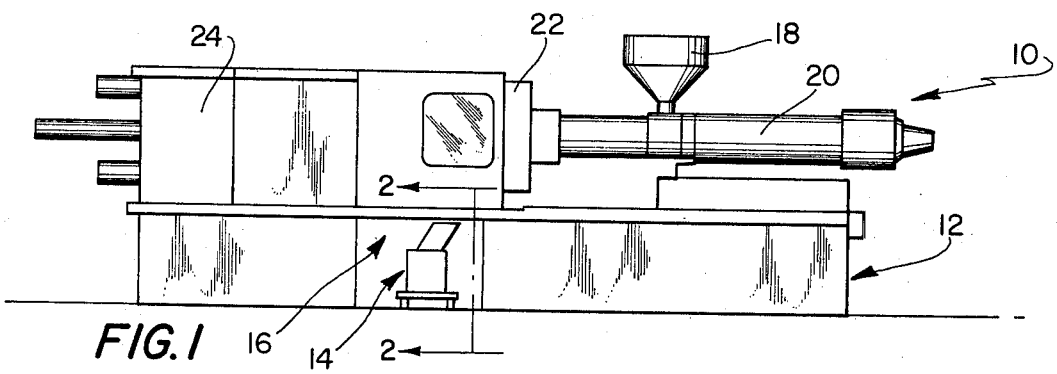
FIG. 1 is a side elevational view showing the overall disposition of the apparatus of the present invention including the granulator and the injection molding machine.
Figure 3:
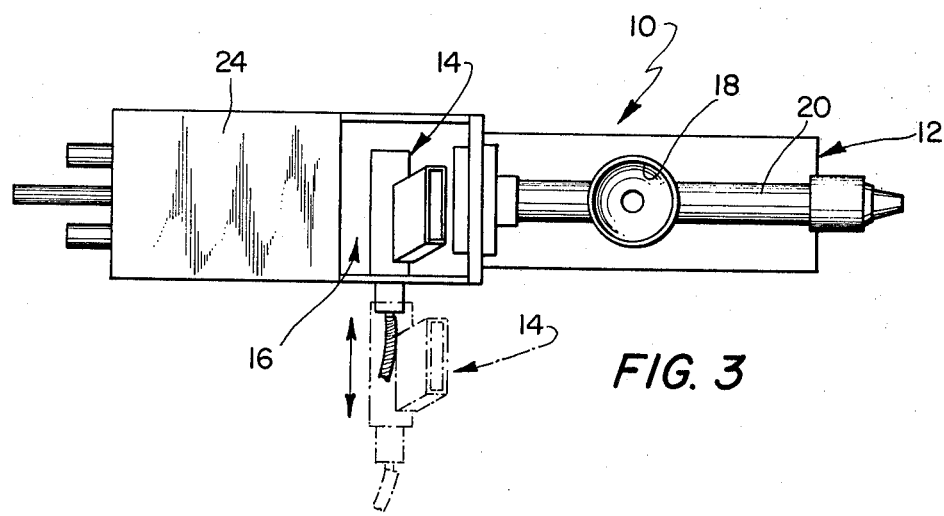
FIG. 3 is a top plan view of the apparatus shown in FIG. 1 and depicts the manner in which the granulator may be disposed between operative and inoperative positions with respect to the injection molding machine.
Figure 4:
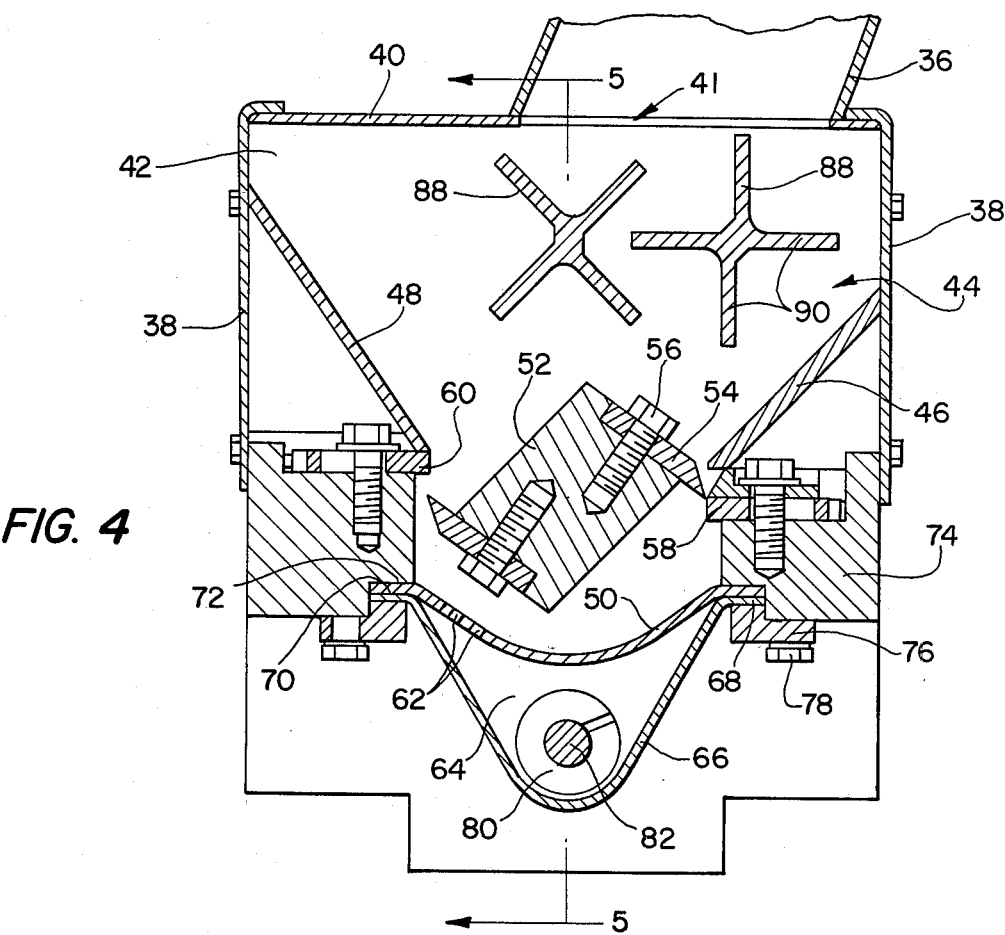
FIG. 4 is a sectional view taken along the line 4—4 of FIG. 2 and shows in particular the various constructional relationships of the granulator.

Turning now to the drawings and more particularly FIGS. 1 and 3 thereof, the apparatus 10 of the present invention includes an injection molding machine 12 and a granulator 14 disposed with respect to the injection molding machine 12 for in and out, that is, lateral movement into and out of the drop out area 16 of such machine. The machine includes the normal features of an injection molding machine including a feed hopper 18, a screw or piston 20 for the injection of plastic material into mold portions 22 and a rear end 24 which houses appropriate mechanisms for opening and closing the mold portions 22 such that plastic scrap including sprues and runners will drop as by gravity into the drop out area 16. It should be noted in this regard that the plastic articles formed by the machine 12 are arranged to be removed from the machine at a point longitudinally removed from these mold portions 22 generally positioned above the drop out area 16 as by the provision a three-part mold and the sequence of operation thereof as is known in the art. Generally and as best shown in FIG. 3, that portion of the floor or other area which supports the injection molding machine 12 adjacent one of the longitudinally orientated sides thereof comprises an aisle, i.e. an area between adjacent such machines in an overall plant arrangement, although certainly the apparatus of the present invention will function with a single injection molding machine. However, the insurance of safe and efficient operation of the plant using one or more injection molding machines is an object to which the apparatus of the present invention and its operational manner is directed.

Figure 2:
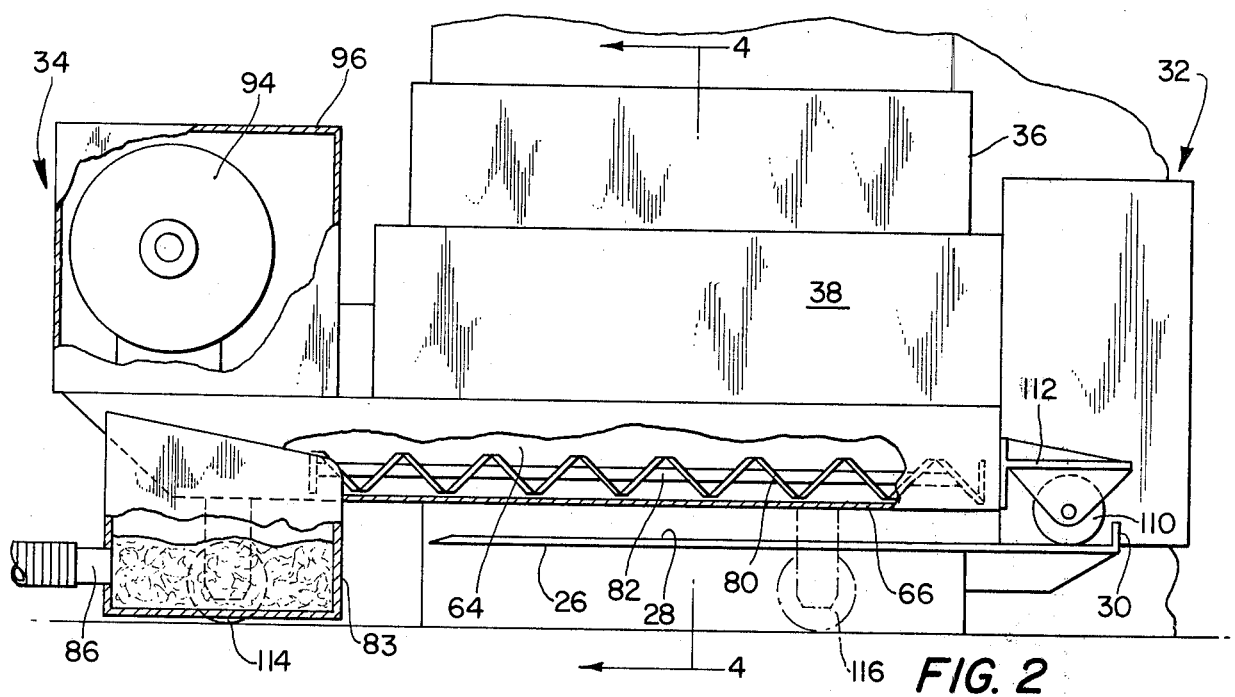
FIG. 2 is a cross-sectional view taken along the lines 2—2 of FIG. 1 with parts broken away and shown in phantom for clarity.

Accordingly, the machine 12 includes a pair of laterally directed spaced parallel rails 26 best shown in FIG. 2 disposed in the drop out area 16 such that granulator 14, in a manner as will hereinafter be explained, may ride to an operative position essentially entirely within the drop out area 16. The granulator may also move to a repair or cleaning position laterally removed therefrom and disposed in the aisle adjacent to machine 12 as best shown in FIG. 3 by the phantom line depiction. The rails 26 include an essentially flat upper surface 28 and a stop in the form of an upstanding end wall 30 positioned inwardly of the drop out area. The rails are welded or otherwise fixed to a frame of the machine 12. The granulator 14 includes a first end 32 which is adapted to initially extended into the drop out area and a second, opposite end 34. The second end, in the operative position of the granulator, is disposed proximal the side of the machine 12 adjacent to aisle into which the granulator is adapted to be laterally moved in its inoperative position as shown in FIG. 3. Thus the first end 32 of the granulator moves into the drop out area 16 for disposition inwardly thereof such that essentially the entire granulator 14 is disposed therein and in a position such that sprues and runners may drop as by gravity into the granulator 14 by means of a chute 36 formed of any desired configuration.

The granulator 14 includes elongated sidewalls 38 and a top wall 40 suitably secured thereto and to end walls 42 by known means such as screws. The chute 36 normally forms a part of the upper wall 40 and includes an entrance portion 41 to the granulator chamber 44 partially formed thereby. The chamber is further defined by downwardly inwardly slanted chamber walls 46 and 48 disposed respectively on the down stroke and up stroke sides of the granulator and by a screen 50 disposed at the bottom thereof. A rotor 52 of any desired configuration and provided with cutting means in the form of a plurality of knives 54 suitable secured thereto as by bolts 56 is further included. The rotor 52 is journaled at opposite ends thereof for rotation within the chamber 44 such that scrap materials, i.e. plastic sprues and runners enter the down stroke side of the chamber 44 and are granulated by the coaction of the rotor knives 54 with at least one and generally a pair of bed knives 58 and 60 respectively disposed on the down stroke and up stroke sides of the chamber. Various adjustment mechanisms of known construction are utilized to adjust the cutting gap between the rotor knife 54 and the bed knives 58 and 60. The screen 50 is also provided with a plurality of openings 62 so as to regulate the dwell time of the partially granulated scrap within the chamber 44 and to insure the desired fineness thereof prior to leaving the chamber.

Positioned directly below the chamber 44, is a secondary or granulate chamber 64 formed by an elongated housing 66 including laterally offset terminal flanges 68 on either side thereof. The screen 50 includes similar flanges 70. The flanges 68 and 70 are adapted for face to face position with regard to one another and are received within a longitudinally extending channel 72 provided on opposite sides of a granulator frame 74 in which the bed knives may also be suitably mounted. A plurality of clamps 76 serve to secure the flanges 68 and 70 to the frame 74 by means of bolts 78. The release or loosening of such bolts 78 enable the screen 50 and the housing 66 to be longitudinally withdrawn from the granulator 14 at the second end 34 thereof, i.e. into the aisle adjacent to the injection molding machine 12. Such removal may be required to facilitate repair, screen size change or cleaning of the secondary chamber 64 in which the granulate is removed. An auger 80 generally of spiral configuration and having a central shaft 82 is supported for rotation at opposite ends thereof is disposed within the secondary chamber 64 such that granulate received thereby maybe simultaneously moved towards the second granulator end 34. The granulate may be received in a take away box 83 or other mechanism via an opening 84 as by known means such as a vacuum take away 86.

Figure 5:
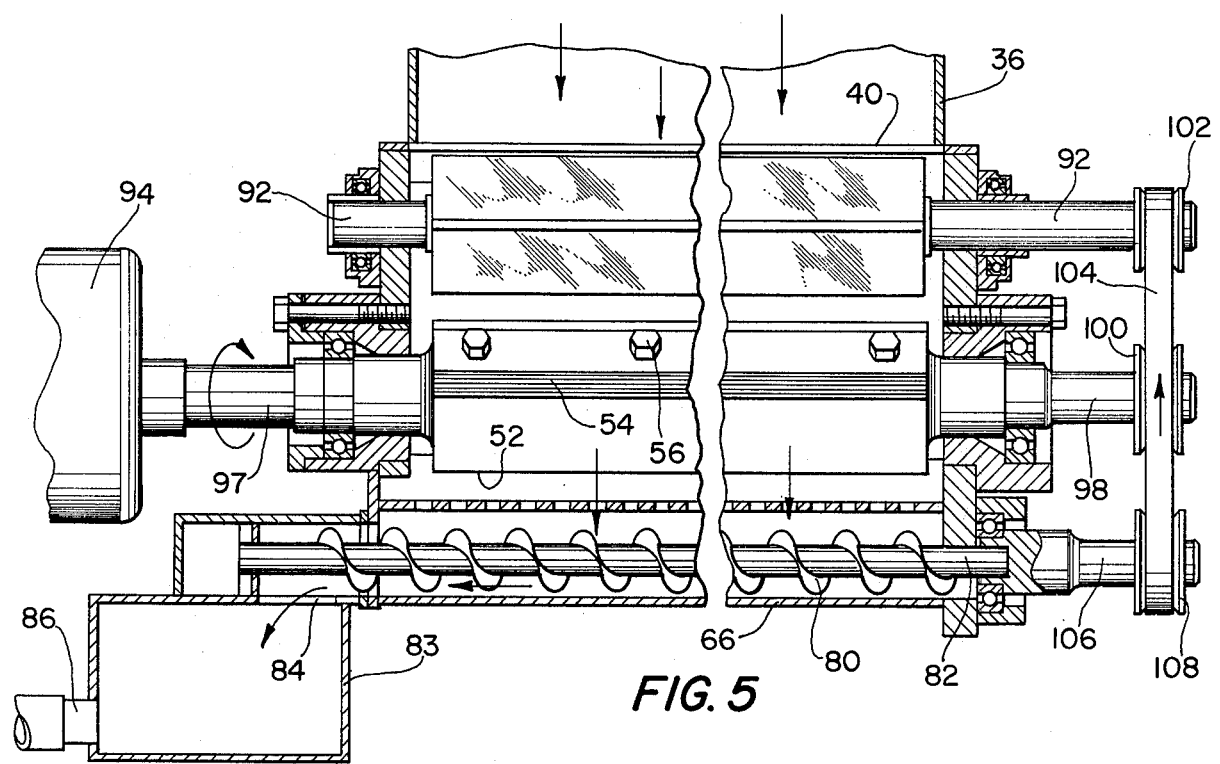
FIG. 5 is a side sectional view taken along lines 5—5 of FIG. 4, such view particularly showing the drive mechanisms whereby the various constructional aspects of the granulator move in relationship to each other.

The upper end of the chamber 44 is provided with a pair of laterally spaced longitudinally directed paddle rolls 88 each having a plurality of circumferentially spaced outwardly radiating blades 90 which are adapted to interdigitiate with each other as the paddle rolls are rotated towards each other in opposite rotational directions. The paddle rolls 88 are suitably provided with shaft extensions 92 at opposite ends thereof which extensions are suitably mounted for rotation. As best shown in FIGS. 2 and 5, a motor 94 is mounted at the second end 34 of the granulator within a cover 96 and is supported by an extension of the granulator frame 74 or a suitable bracket attached thereto (not shown). The motor 94 is suitably coupled to a shaft extension 97 of the rotor 52 and such is driven from the second end 34 of the granulator. A rotor shaft extension 98 extends beyond the granulator frame at the opposite or first end 32 thereof and is provided with a drive pulley 100. Suitable pulleys 102 are also provided on each of the shaft extensions 92 of the paddle rolls 88 such that drive belts 104 trained over such pulleys 100 and 102 may simultaneously drive the paddle wheels 88. In addition, the auger shaft 82 is provided with a shaft extension 106 at the first granulator end 32 and is also provided with a pulley 108 such that it also may be simultaneously driven by the rotation of the granulator rotor shaft extension pulley 100. The rotational speed of the paddle wheels 88 as well as the auger 80 may be suitably determined by appropriate sizing of the various pulleys or by other known means such that the desired ratio of feed of the plastic scrap into the down stroke nip of the granulator formed by the interaction of the rotor knife 54 and the down stroke bed knife 58 is regulated.

It should also be brought out that as the blades 90 of the paddle rolls 88 mesh or interdigitate with each other, such coaction essentially blocks the flyback of partially ground granulate from exiting the granulation chamber 44 through the entrance at the base of the chute 36. Such cooperation of the paddle rolls 88 also to some extent serves to reduce the noise generated by the granulator as by confining a portion of the soundwaves created from emanating out of the entrance portion 41 thereof. Essentially however the main sound reduction feature of the device is the incorporation of the auger 80 which by eliminating normally high velocity air flow present in the secondary chamber 64 drastically reduces the amount of resonance noise produced by the granulator. Also, inasmuch of the granulate passing through the openings 62 may still be hot, not only from the heat of the injection molding cycle but also through the various frictional forces generated in the granulation chamber, the separate flights of the auger serve to space portions the granulate from and out of contact with each other so as to reduce the likelihood of undesirable granulate agglomerates being formed. In addition, large skeleton-like scrap plastic pieces are engaged in the cutting nip of the granulator chamber while still being mutually contacted and accordingly held by the intermeshing paddle roll blades 90 such that a restraining force is applied to such elongated scrap articles so that a cleaner cutting is afforded and so that such scrap is progressively drawn into the lower part of the granulator chamber below the rotor 52 by such cutting action.

The lateral movement of the granulator 14 with respect to the machine 12 is facilitated in part by a first pair of wheels 110 positioned at the granulator front end 32. These wheels 110 are supported from a bracket 112 in turn welded or otherwise attached to the granulator frame 74. A second pair of wheels 114 are similarly attached to the granulator frame at the second end of thereof. The wheels 110 are adapted to ride on or in the rails 26 from the open front thereof to an inward position determined by the stop or stops 30 while the wheels 114 are adapted to remain on the floor or other surface on which the machine 12 rests. Accordingly, and as best shown in FIGS. 1-3, the granulator is adapted to move as by rolling action into the drop out area 16 to an operative position essentially entirely therein as shown by the full lines of FIG. 3 to a laterally removed inoperative repair or cleaning position shown by the phantom line representation in FIG. 3. The wheels 110 are generally of a smaller diameter than wheels 114 and both sets of wheels may be of the swivel type. In addition, a third pair of wheels 116 may be temporarily affixed to the frame 74 proximal the first end 32 thereof as when the granulator is to be fully supported by the floor as for removal from the machine 12.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims, as for example although the primary purpose for the present granulator construction is for adaption beneath an injection molding press, such construction can also be independently utilized to advantage.

What is claimed is:

1. In combination with a machine for the injection molding of plastic material parts, a granulator for the size reduction of the plastic scrap such as sprues and runners simultaneously formed with said parts, said machine having means for injecting fluid plastic material into a mold cavity formed between opposed mold portions and means for supporting said mold portions so as to enable them to be opened and closed in conjunction with the injection of said material thereinto, said machine further of an overall elongated configuration wherein said mold portions move relative to each other in a longitudinal direction, said machine additionally including an open drop out area beneath said mold portions into which said scrap may drop as by gravity upon the opening of said mold portions, said drop out area having an opening on at least one of the lateral sides of said machine, said granulator having opposite first and second ends and adapted for positioning essentially entirely within said drop out area in an operative position thereof with respect to said machine and for lateral movement with respect to said machine so that said second end extends outwardly of said opening in an inoperative position thereof, said granulator having elongated walls defining a generally enclosed chamber, an elongated rotor mounted for rotation about an elongated axis within said chamber, cutting means affixed in said rotor, bed knife means mounted for projection into said chamber at least on the rotor downstroke side thereof for cooperative cutting relationship with said cutting means as said rotor is driven, elongated feed means positioned in said chamber above said rotor and generally aligned therewith and at least partially enclosing said chamber at the upper end thereof whereby scrap falls directly into said granulator feed means from said mold portions, and elongated removal means positioned below said chamber and generally aligned therewith for removing granulated scrap from said granulator to a location at said second end, said machine including a pair of spaced rails laterally disposed within said drop out area thereof and oriented generally traversely with respect to the overall longitudinal disposition of said machine, said granulator including a first pair of wheels at said first end thereof adapted for rolling engagement with said rails, a second pair of wheels at said opposite end thereof, said second wheels adapted for rolling engagement with the surface on which said machine is supported and on a plane below that defined by said rails whereby said granulator and said first end thereof may be rolled laterally into and out of said drop out area between operative and non-operative positions of said granulator respectively.

2. The apparatus of claim 1, said second pair of wheels of a larger diameter than said first pair thereof and said granulator further including a third pair of wheels of a diameter corresponding to said second pair, said third wheel pair adapted for positioning proximal said first wheel pair when said granulator is positioned in an inoperative position.

3. The apparatus of claim 2, said third pair of wheels removably mounted such that they maybe removed when said granulator is positioned in an operative position essentially entirely within said drop out area.

4. The apparatus of claim 1, said granulator feed means including a pair of elongated paddle rolls each having spaced blades radially extending from a central shaft, said blades and said shafts longitudinally unbroken and extending at least a major portion of the longitudinal extent of said rotor, said blades adapted to interdigitate with each other as said shafts rotate in opposite directions so as to create said at least partial enclosure of said chamber upper end, said paddle rolls primarily disposed in that granulator chamber guadrant located above the horizontal axis of said rotor and on the downstroke side of the vertical axis thereof, whereby rotation of said paddle rolls towards each other causes the blades thereof to engage and meter plastic scrap into the granulator nip formed by the coaction of said rotor cutting means and said downstroke bed knife means.

5. The apparatus of claim 4, said granulator including an elongated screen defining the lower end of said chamber, a housing positioned below said screen and defining an elongated secondary chamber for receipt of plastic scrap granulate from said granulator chamber, and an elongated auger screw mounted for rotation in said secondary chamber so as to force said granulate towards said second end of said granulator.

6. The apparatus of claim 5, a granulator frame, said chamber screen and said secondary chamber housing both including laterally extending side flanges disposed in face to face relationship and in turn supported on said frame, said screen and said housing longitudinally slidable with respect to said frame for removal thereof from said granulator second end.

7. The apparatus of claim 4, said granulator including a motor mounted at said second end thereof, means connecting said motor to said rotor for driving said rotor from said second end thereof, said rotor, said paddle rolls and said auger each having drive means disposed at said first end thereof whereby rotation of said rotor drives said paddle rolls and said auger.

* * * * *